Aug. 23, 1938.   W. B. HENDREY   2,128,029
SOLVENT REFINING OIL
Filed Oct. 17, 1936
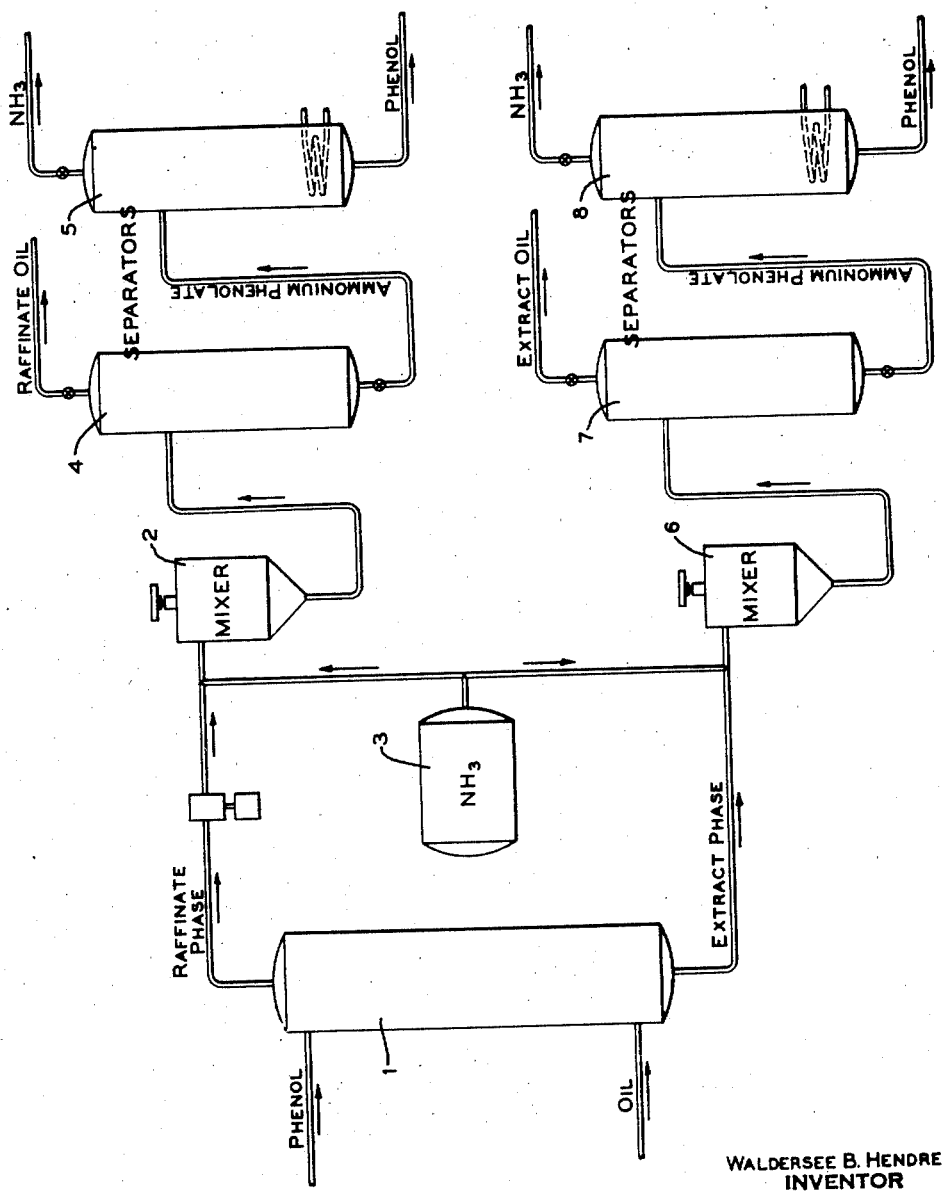
WALDERSEE B. HENDREY
INVENTOR
BY R. J. Dearborn
ATTORNEY Patented Aug. 23, 1938

2,128,029

UNITED STATES PATENT OFFICE 2,128,029

SOLVENT REFINING OIL

Waldersee B. Hendrey, Beacon, N. Y., assignor to The Texas Company, New York, N. Y., a corporation of Delaware Application October 17, 1936, Serial No. 106,097

2 Claims. (Cl. 196—13)

This invention relates to a process for solvent refining of hydrocarbon oil, and more particularly to a process for refining petroleum and fractions derived therefrom.

The invention contemplates refining oil with a selective solvent of the phenol type, such as phenol, chlorphenol, etc. It contemplates a method in which the solvent is recovered from the oil subsequent to the refining operation by treating the mixture of oil and solvent with ammonia, preferably anhydrous ammonia, under conditions of temperature and pressure such that the selective solvent compound of the phenol type forms with the ammonia an addition compound which is substantially immiscible with the oil. The addition compound can then be readily separated from the oil by decantation or other means. In this way, the phenol type of solvent is separated from the oil and is subsequently recovered for reuse upon decomposition of the addition compound.

Selective solvents, such as phenol and chlorphenol, when mixed with anhydrous liquid ammonia in substantially equal molecular proportions, form compounds which are stable under elevated pressure, and which decompose with reversion to the original compounds when the pressure is released. For example, phenol reacts with liquid ammonia under pressure to form ammonium phenolate, a compound which breaks down readily when the pressure is released, liberating ammonia for reuse in the process. Chlorphenols also form the corresponding ammonium chlorphenolates, and these compounds likewise break down upon reduction of the pressure liberating ammonia.

Accordingly, my invention involves the application of the above principle to the solvent refining of hydrocarbon oils, such as mineral oils, as a means of recovering selective solvents of the phenol type from the oil undergoing treatment. This method of recovery is advantageously applied where the oil undergoing treatment is a gasoline or naphtha fraction, and in which case the boiling point of the solvent may be within the boiling range of the gasoline fraction undergoing treatment, so that it is difficult, if not impossible, to separate the solvent from the gasoline by the conventional distillation method.

It is, of course, contemplated that the invention is applicable to the treatment of other types of oils, such as lubricating oil fractions.

In practicing the invention, the oil to be treated is mixed with a selective solvent, such as phenol, under conditions such that the oil and solvent mixture separates into extract and raffinate phases. The extract phase comprises the bulk of the solvent with the soluble constituents of the oil dissolved therein. The raffinate phase comprises the insoluble portion of the oil together with a relatively small amount of the solvent liquid.

Thus, in the usual solvent refining operation, as applied to the treatment of lubricating oil stock, the extract phase comprises the low viscosity index constituents dissolved in the solvent, while the raffinate phase comprises the high viscosity index and relatively paraffinic constituents of the oil mixed with a small amount of the solvent.

These two phases are separated and, in accordance with the method of my invention, are separately treated with liquefied anhydrous ammonia under the proper conditions of temperature and pressure. The phenol combines with the ammonia to form an addition compound, as already explained, which is stable only under pressure, and which is substantially immiscible with the oil but soluble in any excess ammonia that is present. Upon standing, under pressure, the addition compound separates from the oil, leaving it substantially free from the solvent.

The separated portion, comprising the addition compound and excess ammonia, is then withdrawn and conducted to a vessel wherein the pressure is released so that the compound decomposes with the liberation of ammonia, and the consequent recovery of the solvent in its original form.

In order to illustrate the invention, as applied to the solvent refining of mineral oil, reference will now be made to the accompanying flow diagram.

The oil to be treated is drawn from a source not shown and introduced to the lower portion of an extraction tower 1, while the solvent, phenol, is also conducted from a source not shown, and introduced to the upper portion of the tower.

The temperature maintained within the tower will depend upon the degree of extraction desired as well as the nature of the oil undergoing treatment, but generally will be around about 50° to 100° F. The solvent is introduced to the tower in the ratio of about two to four parts of the solvent to one part of oil.

The extraction tower is advantageously of the conventional packed type adapted to effect countercurrent contact between the oil and the solvent.

The raffinate phase accumulates in the upper portion of the tower, while the extract phase accumulates in the lower portion thereof.

The raffinate phase is continuously removed and conducted by a pump to a mixer 2 maintained under pressure and wherein it is mixed with liquid ammonia drawn from a tank 3. The pressure required in the mixer 2 will depend upon the prevailing temperature. Where the temperatures range from 50° to 120° F., for example, the pressure required will range from 90 to about 300 pounds.

The ammonia thus reacts with the phenol contained in the raffinate phase to form the desired addition compound, namely, ammonium phenolate.

The mixture is conducted from the mixer 2 to the separator 4, which is also maintained under pressure and wherein the raffinate oil separates from the addition compound and excess ammonia which is substantially immiscible therewith. The raffinate oil is withdrawn from the top of the separator, as indicated, while the ammonium phenolate and excess ammonia is drawn off from the bottom of the separator and conducted to a separator 5.

The pressure is released to substantially atmospheric pressure in the separator 5 so that decomposition of the phenolate occurs with liberation of the ammonia in gaseous form. The phenol is drawn off from the bottom of the separator as indicated, and is available for reuse.

Vaporization of the ammonia within the separator 5 causes a refrigerative effect and this may be utilized for cooling the liberated ammonia, either before or after compression. This may be accomplished by conducting the ammonia through a coil located within the separator 5, as indicated. The compressed and cooled ammonia is then returned in liquid form to the storage tank 3 for reuse.

The extract phase from the bottom of the extraction tower 1 is also conducted to a separate mixer 6, as indicated, and wherein it is also mixed with liquid ammonia from the storage tank 3. From the mixer 6, the liquid mixture is conducted to a separator 7, similar to the separator 4 already described, and wherein the extract oil is separated from the ammonium phenolate. Extract oil is removed as indicated, while the ammonium phenolate and excess ammonia is conducted to a separator 8, similar to the separator 5 previously described, and wherein the pressure is released and the ammonia is liberated from the phenol.

While I have referred to my invention, as applied to solvent refining operations in which phenol and chlor-phenol are employed as the selective solvents, it is contemplated that a modification of the invention may be made where other types of selective solvents are used, such as nitrobenzene, aniline, benzyl alcohol, benzyl amine, phenyl cyanide, etc. While the ammonia may not form reaction compounds with these particular solvents, nevertheless it may be used as a washing solvent with which to wash or extract the solvents in question from mineral oil. The solubility of mineral oil in liquid ammonia is very small, whereas solvents of the type mentioned above are highly soluble or completely miscible with liquid ammonia. Consequently, by separately washing the extract and raffinate phases with liquid ammonia, it is possible to displace the selective solvents in question from the oil.

This washing treatment is advantageously carried out under pressure. The solution of selective solvent in ammonia is withdrawn and conducted to a separate vessel, wherein the pressure is released and the ammonia separated from the selective solvent by vaporization.

Obviously, many modifications and variations of the invention, as hereinbefore set forth, may be made without departing from the spirit and scope thereof, and therefore only such limitations should be imposed as are indicated in the appended claims.

I claim:

1. In the refining of hydrocarbon oil by solvent extraction with a phenol extraction solvent, the method of recovering the solvent from the oil comprising mixing the oil containing said solvent with anhydrous ammonia in at least equal molecular proportion with the phenol and under a pressure sufficiently elevated above atmospheric so that substantially all the phenol is converted into an addition compound substantially immiscible with the oil, separating the addition compound formed from the mixture while under said elevated pressure, introducing the withdrawn compound to a zone of reduced pressure such that the compound is decomposed into ammonia and the original phenol solvent without application of heat, and removing the product so formed.

2. The method according to claim 1 in which the ammonia and oil containing phenol solvent are mixed under a pressure of 90 to 300 pounds while at a temperature of 50 to 120° F.

WALDERSEE B. HENDREY.